United States Patent [19]

McDaniel

[11] 3,801,803
[45] Apr. 2, 1974

[54] ELECTRONIC CONVERSION SYSTEM
[75] Inventor: George H. McDaniel, Northville, Mich.
[73] Assignee: The Bendix Corporation, Southfield, Mich.
[22] Filed: Oct. 11, 1972
[21] Appl. No.: 296,713

[52] U.S. Cl............. 235/154, 235/155, 235/151.11
[51] Int. Cl............................................. G06f 5/02
[58] Field of Search.......... 235/154, 92 DM, 92 CC, 235/151.11, 151.33, 151.34, 156

[56] References Cited
FOREIGN PATENTS OR APPLICATIONS
1,240,882   7/1971   Great Britain...................... 235/154

Primary Examiner—Eugene G. Botz
Attorney, Agent, or Firm—Lester L. Hallacher

[57] ABSTRACT

Apparatus for converting displacement command pulses in an N/C system from Metric to English systems of measurement. The apparatus is entirely external to the N/C machine and employs relatively simple arithmetic units to effect the multiplication of both positive and negative displacement pulse quantities by a fractional conversion factor.

4 Claims, 2 Drawing Figures

PATENTED APR 2 1974 3,801,803

ELECTRONIC CONVERSION SYSTEM

INTRODUCTION

This invention relates to numerical control systems for machine tools and the like and more particularly to an arithmetic conversion apparatus for converting pulse quantities representing displacement commands from one measurement system to another; e.g., from Metric to English.

BACKGROUND OF THE INVENTION

The typical numerical control system for a machine tool, such as a lathe or milling machine, or for some similar apparatus, such as a drafting machine or CRT display system, typically involves an input medium, such as a punched tape, for conveying displacement commands and other signals to the instrumentality which executes these commands. A common system employs a punched Mylar tape bearing digital characters in an eight-bit binary code and a tape reader for scanning the tape serially and converting the eight-bit punched characters into corresponding electrical signals. These signals may include displacement commands for the various axes of controlled displacement, feedrate commands, coolant controls, and so forth.

The displacement commands are generally applied to the axis displacement control system in the form of pulses wherein each pulse represents a given quantity of displacement; e.g., in a Metric system 1,000 pulses represents 1 millimeter of displacement. Assuming that for a given application it became desirable to represent displacement commands in another system of measurement, for example, English rather than Metric, it was heretofore thought necessary to redesign the entire control system so as to accomplish the conversion internally. This redesign and alternative construction often adds considerable expense to the apparatus.

BRIEF DESCRIPTION OF THE INVENTION

In accordance with the present invention, a numerical control system is provided for converting displacement control signals representing a quantity of displacement in one system of measurement to displacement control signals representing the same quantity of displacement in another system of measurement without requiring a basic reconstruction of the numerical control system but simply by adding a conversion system between the programming medium and the axis displacement control system. In general, this is accomplished through the use of converter means connected to receive the command pulses representing given quantities of displacement and to effectively multiply these quantities by a predetermined conversion factor so as to produce a second different pulse number representing the same quantity of displacement but in a second system of measurement.

In the preferred embodiment of the invention hereinafter described in detail, the converter apparatus is shown to comprise a pulse quantity storage means and a first arithmetic means which, for pulse quantities representing positive axis displacement, is responsive to input displacement command signals to add into the storage means a predetermined quantity representing the numerator of the conversion factor. Additional means are provided for determining when the sum of the signals in the storage means equals or exceeds a second quantity representing the denominator of the conversion factor and when the sum so equals or exceeds this quantity, a subtraction step is carried out. A pulse is outputted from the storage means as the subtraction step is carried out. An analogous operation is carried out for pulse quantities representing negative displacements.

DETAILED DESCRIPTION OF THE ILLUSTRATIVE EMBODIMENT

Figure 1:
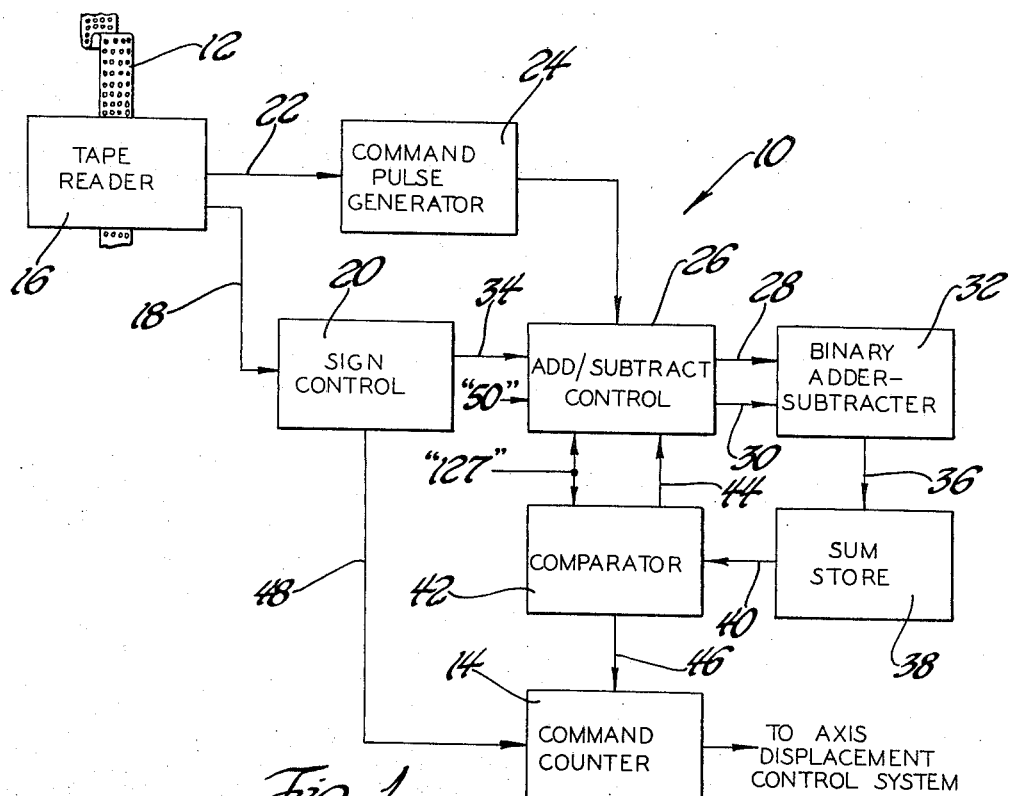
FIG. 1 is a block diagram of a system embodying the invention.

FIG. 1 illustrates a system 10 for converting displacement control signals taken from a programming medium in the form of a punched tape 12 into axis displacement commands at the output of a command counter 14 and suitable for application to a servo-type axis displacement control instrumentality. In addition the system 10 of FIG. 1 is effective to convert the displacement control signals read from the tape 12 from the Metric system of measurement to the English system of measurement.

System 10 comprises a conventional eight-bit tape reader 16 which is an electro-optical device adapted to convert the punched tape characters into corresponding electrical control signals. Among the characters on the tape 12 are axis displacement commands including an axis designation, a direction command (either positive or negative) and an absolute displacement quantity expressed in the metric system of measurement. In FIG. 1 only one displacement axis is represented, it being understood that straightforward duplication is required to implement other axes. The direction or sign of displacement is represented by a signal on line 18 and is applied to a plusminus sign control unit 20. The absolute quantity of displacement is represented by a signal appearing on line 22 and is applied to a command pulse generator 24 which produces a quantity of displacement command pulses representing the absolute quantity of displacement in the Metric system of measurement. Typical resolution for the command pulse generator is: 1,000 pulses represents 1 millimeter of actual displacement of the controlled instrumentality along the selected axis.

In the illustrative example of FIG. 1 the conversion from Metric to English involves the establishment of a conversion factor. As indicated above, the typical numerical control system based on the Metric system of measurement employs a basic resolution of 1,000 pulses for each millimeter of displacement. Similarly, the typical numerical control system based on the English system of measurement employs a command pulse to displacement relationship of 1,000 pulses for each 0.1 inch of displacement. Therefore, 2.54 Metric pulses represent the same absolute quantity of displacement as one English pulse. In accordance with this conversion rate, the command pulse quantities from the pulse generator 24 may be multiplied by a conversion factor of 100/254 or, more conveniently, 50/127 to convert any given Metric quantity of displacement command pulses into the English system for application to the command counter 14.

Looking again to FIG. 1, the multiplication of the command signal quantities by the conversion factor 50/127 is carried out as follows. The command pulses from generator 24 are applied to an arithmetic control unit 26 having access to binary representations of the numerator 50 of the conversion factor as well as the denominator 127 of the conversion factor. Arithmetic control unit 26 has numerical and sign control outputs 28 and 30, respectively, connected to a binary adder-subtracter 32 for controlling the sign and absolute value of arithmetic operations to be carried out in response to the command pulses. The sign control unit 20 is connected by way of line 34 to the arithmetic control unit 26 for purposes to be described. The quantities to be produced by the binary adder-subtracter unit 32 are connected by way of line 36 to a pulse quantity storage unit 38. The storage unit 38 is connected by way of line 40 to a binary comparator 42 to compare the contents of the storage unit 38 to the binary representation of the denominator 127 of the conversion factor and to generate signals on output lines 44 and 46 whenever the contents of the storage units 38 equals or exceeds the denominator quantity. Output 46 is connected directly to the command counter 14 to enable the generation of an axis displacement command pulse to complete the conversion.

Numerically, the operation of FIG. 1 is as follows: assuming a positive axis displacement command is generated as indicated by the sign on control line 18, each positive command pulse generated by the Metric system command pulse generator 24 causes a binary representation of the numerator 50 to be added into the binary storage unit 38 by way of the arithmetic control unit 26 and the binary adder 32; the sum of the signals stored in the storage unit 38 are continously compared to the denominator representation 127 in the comparator 42 and when the contents of the storage unit 38 equals or exceeds 127, an output pulse is applied by way of line 46 to the English system command counter 14 and a representation of the number 127 is subtracted from the contents of the storage unit 38; the difference is then stored in the storage unit 38 for the next repetitive operation.

Assuming a negative axis displacement is called for, the sign control unit 20 generates a signal representing the opposite sign and this signal is applied by way of line 34 to the arithmetic control unit 26 to effectively reverse the operations set forth above. For each command pulse generated by the command pulse generator 24 the number 50 is subtracted from the contents of the storage unit 38. Whenever the contents of unit 38 becomes negative, a pulse appears on output line 46 to the English command counter 14 and the number 127 is added to the contents of the storage unit 38. The operation then repeats for each command pulse from the generator 24.

It will be observed from the above description of the operation of the system 10 of FIG. 1 that the command pulses from generator 24 represent a given displacement quantity in the Metric system whereas the output from the command counter 14 represents the same quantity of displacement in the English system. Therefore, it is to be understood that the axis displacement control system including the servo motor and associated controls driven by the signals from counter 14 are calibrated for English input signal-to-output displacement characteristics. It should also be noted that as many as three Metric system command pulses may have to be generated before an output appears on line 46 to cause the command counter 14 to produce an output signal. The resolution of the system 10 is, therefore, 0.0001 inches rather than 0.001 millimeters as would be the case without the measurement system conversion.

Figure 2:
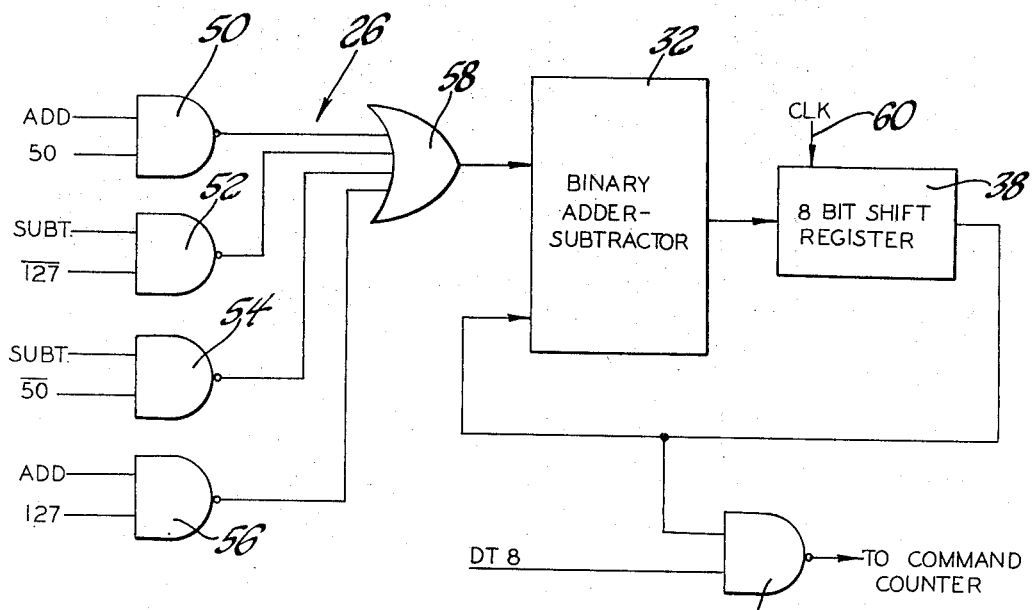
FIG. 2 is a schematic diagram of a portion of the block diagram of FIG. 1.

Looking now to FIG. 2, certain of the elements in the system of FIG. 1 are shown and described in greater detail. In FIG. 2, the arithmetic control unit 26 of FIG 1 is shown to comprise a system of four NAND gates 50, 52, 54, and 56 having inputs as shown to accomplish the four possible arithmetic operations. NAND gate 50 is connected to receive an "add" input which is activated by a combination of a command pulse from generator 24 and by the simultaneous occurrence of the positive displacement signal from sign control unit 20. The numerator quantity 50 is connected to the other input of NAND gate 50. NAND gate 52 is connected to receive a "subtract" actuation signal as well as the complement of the denominator quantity 127 so as to accomplish the arithmetic operation of subtracting the number 127 from the contents of the storage unit 38. NAND gate 54 is connected to receive the subtract signal and the complement of the numerator quantity 50 so as to perform the arithmetic operation of subtracting the quantity 50 from the contents of the storage unit 38. Finally, NAND gate 56 is connected to receive the add signal as well as the denominator quantity 127 so as to carry out the arithmetic operation of subtracting the quantity 127 from the contents of the storage unit 38. The outputs of all of the NAND gates 50, 52, 54, and 56 are connected through an exclusive OR gate 58 so that only one operation can be carried out at a time. The output of the OR gate is connected to the binary adder/subtracter unit 32 which, as will be apparent to those skilled in the art, may be implemented using any of several well known binary full-adder designs. It is well known to those skilled in the art that the subtraction function is carried out by means of complementary addition and, accordingly, the implementation of unit 32 is a straightforward application of the prior art and no detailed description will be given.

As shown in FIG. 2, the storage unit 38 may take the form of an eight-bit shift register having a clock input 60 for shifting the contents of the register from left to right in a sequence of clock pulses which may be broken down into digit times DT1 through DT8. The selection of the numerator quantity 127 in the conversion factor for Metric-to-English conversion is especially advantageous in that the binary representation of the number 127 is 01111111, with the least significant digit at the right. Accordingly, the least significant bit appears at the righthandmost bit position of shift register 38 at DT1 and the most significant bit appears at that same position at DT8. The compare circuit of comparator unit 42 needs only detect a "one" at DT8 to determine that the contents of the shift register 38 is greater than 127. When operating on negative displacement quantities, the comparator 42 needs only detect a "one" at DT8 to determine that a negative number is present. Therefore, the same logic rule applies for the comparator circuit 42 for both positive and negative displacement quantities and, accordingly, a simple logic circuit may be employed.

As shown in FIG. 2, this logic circuit may include a NAND gate 62 having one input connected to the righthandmost bit position in the eight-bit shift register 38 and another input connected to the DT8 clock pulse. The output is then connected to the command counter 14 as indicated. The recirculation of bits in the shift register 38 through the arithmetic control unit 32 is accomplished by means of the connection from the righthandmost bit position to the input of the arithmetic unit 32 as shown in FIG. 2.

It is to be understood that various implementations other than that described herein will be apparent to those skilled in the art for the realization of the specific conversion technique herein described and, accordingly, the foregoing descripting of apparatus is to be taken as illustrative rather than limiting. In addition, it is to be understood that the present invention may be adapted to any conversion factor desired and, hence, the invention is not limited to Metric-to-English conversion applications.

The embodiments of the invention in which an exclusive property or privilege is claimed are defined as follows:

1. Apparatus for use in a numerical control system for converting displacement control signals in one system of measurement to displacement control signals in another system of measurement comprising: input means for producing a first quantity of displacement command pulses representing a quantity of displacement in said one system of measurement; converter means connected to receive said first quantity of pulses and responsive thereto to produce a second quantity of displacement command pulses representing the same quantity of displacement but in another system of measurement; said first and second quantities being related by a predetermined conversion factor equal to a predetermined fraction having a numerator and a denominator; and output means connected to receive said second quantity of signals and to apply said quantity to a displacement control system; said converter means including pulse quantity storage means, first arithmetic means connected to said input means and said storage means for adding a third quantity in said storage means representing said numerator for each pulse in said first quantity, and second arithmetic means connected to said storage means for subtracting a fourth quantity representing said denominator in said storage means each time the sum of said third quantities equals said denominator.

2. Apparatus as defined in claim 1 wherein said converter means includes comparator means for storing a fifth quantity representing said denominator, said pulse quantity storage means being connected thereto.

3. Apparatus as defined in claim 1 wherein said conversion factor is 50/127 whereby said first system of measurement is Metric and said second system of measurement is English.

4. Apparatus as defined in claim 1 including sign control means for selectively controlling the positive and negative arithmetic effects of said addition and subtraction quantities according to the direction of displacement to be followed by said displacement control system.

* * * * *